Patented Feb. 28, 1950

2,498,638

UNITED STATES PATENT OFFICE 2,498,638

CORK COMPOSITIONS

John W. Baymiller, Manheim Township, Lancaster County, Pa., assignor to Armstrong Cork Company, Lancaster, Pa., a corporation of Pennsylvania No Drawing. Application May 13, 1947, Serial No. 747,835

10 Claims. (Cl. 260—8)

This invention relates to cork compositions and to a method of making the same. More particularly, the invention relates to cork compositions comprising cork particles, a resinous or proteinaceous binder, and a significant amount of a rubber-like copolymer of an open chain aliphatic conjugated diene and alpha-methyl-para-methylstyrene, which compositions are capable of being formed into a desired configuration by means of the extrusion technique.

Cork compositions comprising cork particles and binders are widely employed in the manufacture of various products, such as gaskets, closure liners of the disc and ring type, textile roll coverings, and the like. One widely employed method of making such products from cork composition includes forming a mixture of the binder and cork particles in the desired proportion and extruding the composition through a die of predetermined dimensions at elevated temperature. This results in the production of a material known in the art as "cured cork composition," which material exhibits the configuration imparted to it by the die. Generally speaking, the extruded composition is obtained in the form of a rod, tube, mat, or block of the desired dimensions which may be readily cut or otherwise shaped into the desired article. For example, a tube may be cut into a textile roll covering, commonly referred to as a "textile cot."

In the extrusion of cork composition in the manner indicated above, it is practically essential to employ a lubricant to assist in the movement of the composition through the extrusion device. Heretofore, wax-like materials, such as paraffin, have been employed. Although such materials do result in some lubrication of cork composition during extrusion thereof, because of the comparatively low viscosity of paraffin, particularly at the elevated temperatures employed during extrusion, which temperatures are in the order of about 275° F., the paraffin penetrates into the mass being extruded, and thus its lubricating effect is lost or at least substantially reduced at the surface of the particles, thus making the extrusion operation difficult. This is due to the fact that the maximum lubrication effect is desired at the surface of the composition where it is in contact with the walls of the extrusion tube.

In order to overcome this difficulty, there have been various materials proposed for use in modifying paraffin to increase its viscosity, particularly at the temperatures employed in extrusion, so that there will be a substantial reduction in penetration of the lubricant during the extrusion of the cork composition. However, considerable difficulty has been experienced in that many of the most desirable modifiers lack sufficient compatibility with paraffin, so that a suitable composition for lubrication is not obtained.

It is, accordingly, an object of this invention to provide an extrudable cork composition containing a suitably modified paraffin as a lubricant.

A further object of this invention is to provide a method of extruding cork composition which may be readily carried out without penetration of the lubricant component thereof.

Still another object of this invention is the provision of a modified paraffin, particularly adapted for use as a component of a cork composition which is to be shaped by the extrusion technique.

These and other objects of the invention will become apparent to those skilled in the art upon becoming familiar with the following description.

I have found that cork compositions containing a binder, such as glue, glue-glycerine mixtures, phenol-formaldehyde resins, urea-formaldehyde resins, and the like, may be compounded with a small but effective amount of a solution in paraffin of a copolymer of an open chain aliphatic conjugated diolefin and alpha-methyl-para-methylstyrene. Such compositions may be extruded through and cured in a conventional extrusion device to a desired shape, such as a rod, tube, and the like, without any sticking to the parts of the processing equipment.

The cork particles employed in the preparation of my compositions may be of the size generally employed in the cork composition art. Advantageously, these particles are in the order of 10-50 mesh. Granulated natural cork or reprocessed cork composition may be used.

The binder component of my readily extrudable composition is, advantageously, any of the proteinaceous or resinous binders generally employed in the manufacture of cork compositions. Examples of such binders are glue, glue-glycerine mixtures, urea-formaldehyde resins, phenol-formaldehyde resins, and the like.

The proportions of cork and binder in my composition may be varied, of course, depending, among other things, upon the final product desired. Generally speaking, the composition advantageously contains about 5% to 25% based on the weight of the cork of the binder component.

In addition to the cork and binder, my composition includes as a lubricant a solution comprising an open chain aliphatic conjugated diolefin-alpha-methyl-para-methylstyrene copolymer dissolved in paraffin. The diolefin utilized in forming the rubber-like component of the lubricant is advantageously an open chain aliphatic conjugated diolefin containing 4 to 6 carbon atoms, such as isoprene, butadiene, pentadiene 1,3, and hexadiene 1,3. Particularly advantageous results have been obtained from the use of butadiene-alpha-methyl-para-methylstyrene copolymers. In the preparation of the rubber-like copolymer, the proportions of the components of the polymerizable mixture which may be employed may be widely varied. However, advantageous results have been obtained from use of rubber-like copolymers obtained by the emulsion polymerization of a mixture containing a major portion by weight of diolefin and a minor portion by weight of alpha-methyl-para-methylstyrene. Particularly advantageous results have been obtained by polymerizing in aqueous emulsion a mixture containing about 15 to 40 parts by weight of alpha-methyl-para-methylstyrene and about 85 to 60 parts by weight of the diolefin.

The preparation of rubber-like copolymers employed in the practice of my invention is illustrated by the following specific example in which all parts are given by weight:

Example I

An aqueous polymerizing emulsion was formed comprising:

130 parts butadiene
70 parts alpha-methyl-para-methylstyrene
300 parts water
10 parts 2-amino-2-methyl-1-propanol oleate (emulsifying agent)
0.4 parts ammonium persulphate (polymerization catalyst)

These reaction materials were copolymerized by agitating the emulsion for 288 hours at a temperature of 25° C. and an initial pressure of 36 pounds per square inch which gradually dropped to less than 10 pounds per square inch as polymerization proceeded. The latex-like emulsion was coagulated by pouring it into about 5% acetic acid solution. The precipitated, rubber-like material was somewhat similar to natural crepe and was washed, dried, and broken down or masticated for about 10 minutes by milling between closely set steel rolls. About 2% of an anti-oxidant, phenyl-beta-naphthylamine, was milled into the raw material at this time. The rubber-like material had good tackiness and it was not necessary to add any softening or plasticizing agent before milling.

The modification of paraffin, such as petrolatum, with synthetic rubber-like copolymers of the type described hereinabove, may be accomplished by any suitable means. Generally speaking, it is advantageous to work a portion of the paraffin into the copolymer on a suitable device, such as a cold rubber mill. After obtaining a mixture of the rubber-like copolymer and paraffin, this mixture is dissolved in the remaining portion of the paraffin at elevated temperature, such as above the melting point of the paraffin and advantageously above about 200° F., to obtain a solution of copolymer in paraffin. If desired, the rubber-like copolymer may be dissolved directly in the melted paraffin. In any event, there are obtained solutions of copolymer in paraffin which are stable over long periods of time and which remain homogeneous even after solidification.

The following specific examples in which all parts are given by weight are illustrative of the formation of modified paraffin which may be employed as a lubricant in the cork compositions of my invention.

Example II

Two-hundred parts of the copolymer prepared in accordance with Example I and 200 parts of paraffin were milled for 1½ hours on a rubber mill. 54.7 parts of this mixture was dissolved in 310 parts of paraffin at about 257° F. over a period of 1½ hours. A homogeneous solution was obtained having a viscosity of 34.0 centipoises at 257° F. After 24 hours at a temperature of 180° F. without agitation, the solution was still homogeneous and possessed a viscosity of 33.0 centipoises at a temperature of 257° F. After 48 hours at 180° F. without agitation, the solution was still homogeneous and had a viscosity of 34.2 centipoises at 257° F. The solution remained homogeneous on solidification.

Example III

One-hundred parts of a copolymer prepared according to Example I, 2 parts of hydroquinone, and 100 parts of paraffin were milled together for 1 hour on a rubber mill. Fifty-five parts of the resulting mixture were dissolved in 300 parts of paraffin at 275° F. over a period of 1 hour. The resulting product had a viscosity of 39.4 centipoises, and after 24 hours storage at 180° F., was homogeneous and exhibited a viscosity of 38.0 centipoises at 275° F. After 48 hours at 180° F., the solution was still homogeneous and had a viscosity of 39.5 centipoises at 275° F. The solution was homogeneous after solidification.

Example IV

Equal parts by weight of paraffin and butadine—alpha-methyl-para-methylstyrene copolymer were milled on a cold rubber mill. The dispersion was very easy. Thirty-three parts by weight of this mix was dissolved in 150 parts by weight of paraffin at 270°. Solution was easy and the resulting solution was stored in a 155° F. oven for 24 hours. At the end of this time, the solution remained homogeneous.

Example V

Three and one-quarter pounds of butadiene—alpha-methyl-para-methylstyrene copolymer and 3¼ pounds of paraffin were milled on a rubber mill to obtain mixing of the ingredients. A 10% solution of copolymer in paraffin was prepared by dissolving the above mixture in paraffin at 200° F. Solution was complete in 40 minutes.

While the above specific examples set forth certain proportions to be employed in the preparation of the lubricant component of my compositions, it is to be understood that these may be varied, depending, among other things, upon the particle size of the cork, the density of the final composition, and the amount and composition of the binder. Generally speaking, paraffin solutions containing 5% to 20% copolymer dissolved therein may be advantageously employed in the preparation of extrudable compositions in accordance with my invention. When added to the cork and binder mixture, a significant quantity to give a composition containing up to about 25% by weight of lubricant based on the weight of the cork is generally used. Advantageous results may be obtained with 5% to 25% of lubricant. When more than about 25% of lubricant is employed, a poor bond is obtained as the binder loses its binding action because of the presence of a large amount of lubricant. In any event, a lubricating amount of the paraffin solution is generally employed.

In accordance with the method of my invention, a cork-binder mixture is formed and to this mixture is added the paraffin solution of rubber-like copolymer. The mixture is then extruded through conventional extrusion equipment at elevated temperatures, such as 200° F. to 275° F. The following example is illustrative of a particular composition which may be prepared and extruded in accordance with my invention.

*Example VI*

|   | Parts by weight |
|---|---|
| 24 to 34 mesh cork particles | 100 |
| Glue | 7.50 |
| Glycerine | 15.00 |
| Water | 12.00 |
| Paraformaldehyde | 9.75 |

The binder ingredients were mixed together and allowed to swell. The resulting jelly was milled and mixed with the cork particles. The mix was dried by aeration. A 10% solution of alpha-methyl - para - methylstyrene — butadiene copolymer dissolved in paraffin was mixed with the dried cork-binder composition. Thereafter, the paraformaldehyde was added and after aging for three hours, the batch was extruded in the form of a tube at the rate of about 4" per minute in standard equipment using a temperature of about 250° F.

Compositions prepared in accordance with my invention may be rapidly extruded and cured in conventional equipment. The time required may vary, depending, among other things, upon the particular formulation, the density of the composition, the temperature employed, the dimensions of the desired object, and the like. Generally speaking, compositions may be extruded without sticking at rates of 2" to 6" per minute.

While my invention has been described with reference to certain particular embodiments and with reference to certain specific examples, it is to be understood that the invention is not limited thereby. Therefore, changes, omissions, substitutions, and/or additions may be made without departing from the spirit of the invention as defined in the appended claims which are intended to be limited only as required by the prior art.

I claim:

1. A cork composition comprising a binder of the group consisting of resinous binders and proteinaceous binders, and a paraffin solution containing about 5% to 20% by weight of a rubber-like copolymer of an open chain aliphatic conjugated diolefin and alpha-methyl-para-methylstyrene.

2. A cork composition comprising cork particles, a binder of the group consisting of resinous binders and proteinaceous binders, and a paraffin solution containing about 5% to 20% by weight of a butadiene—alpha-methyl-para-methylstyrene rubber-like copolymer.

3. A cork composition comprising cork particles, a binder of the group consisting of resinous binders and proteinaceous binders, and a paraffin solution containing about 5% to 20% by weight of a rubber-like copolymer obtained by the emulsion copolymerization of an open chain aliphatic conjugated diolefin having 4 to 6 carbon atoms and alpha-methyl-para-methylstyrene.

4. A cork composition comprising cork particles, a resinous binder, and a paraffin solution containing about 5% to 20% by weight of a butadiene—alpha-methyl-para-methylstyrene rubber-like copolymer.

5. A cork composition comprising a proteinaceous binder, cork particles, and a lubricating amount of a paraffin solution containing about 5% to 20% by weight of a rubber-like copolymer of alpha-methyl-para-methylstyrene and an open chain aliphatic conjugated diolefin having 4 to 6 carbon atoms.

6. A cork composition comprising cork particles, 5% to 25% by weight of said cork of a binder of the group consisting of resinous binders and proteinaceous binders and up to 25% by weight of said cork of a paraffin solution containing about 5% to 20% by weight of a rubber-like butadiene—alpha-methyl - para - methylstyrene copolymer.

7. A cork composition comprising cork particles, 5% to 25% by weight of said cork of a binder of the group consisting of resinous binders and proteinaceous binders, and 5% to 25% by weight of said cork of a paraffin solution containing 5% to 20% by weight of a rubber-like copolymer of butadiene and alpha-methyl-para-methylstyrene.

8. An article of manufacture obtained by extruding cork composition comprising a binder of the group consisting of resinous binders and proteinaceous binders, cork particles, and a paraffin solution containing about 5% to 20% by weight of a rubber-like copolymer of alpha-methyl-para-methylstyrene and an open chain aliphatic conjugated diolefin.

9. An extruded article obtained by extruding a cork composition comprising cork particles, a resinous binder, and a 5% to 20% paraffin solution of a rubber-like copolymer of alpha-methyl-para-methylstyrene and an open chain aliphatic conjugated diolefin having 4 to 6 carbon atoms.

10. An extruded article obtained by extruding a cork composition comprising cork particles, a proteinaceous binder, and a 5% to 20% paraffin solution of a rubber-like copolymer of alpha-methyl-para-methylstyrene and an open chain aliphatic conjugated diolefin having 4 to 6 carbon atoms.

JOHN W. BAYMILLER.

REFERENCES CITED

The following references are of record in the file of this patent:

UNITED STATES PATENTS

| Number | Name | Date |
|---|---|---|
| 1,563,410 | Weiss | Dec. 1, 1925 |
| 2,051,944 | Hershberger | Aug. 25, 1936 |
| 2,104,692 | Cooke et al. | Jan. 4, 1938 |
| 2,121,791 | Frink | June 28, 1938 |
| 2,290,392 | Thomas | July 21, 1942 |
| 2,396,293 | Smith | Mar. 12, 1946 |